(12) United States Patent
Rieunier et al.

(10) Patent No.: US 9,188,461 B2
(45) Date of Patent: Nov. 17, 2015

(54) AIRCRAFT FLIGHT MANAGEMENT AID DEVICE

(71) Applicant: THALES, Neuilly-sur-Seine (FR)

(72) Inventors: Camille Rieunier, Toulouse (FR);
Jerome Sacle, Tournefeuille (FR);
Joseph Huysseune, Toulouse (FR);
Xavier Chazottes, Toulouse (FR)

(73) Assignee: THALES, Courbevoie (FR)

( * ) Notice: Subject to any disclaimer, the term of this patent is extended or adjusted under 35 U.S.C. 154(b) by 108 days.

(21) Appl. No.: 13/728,731

(22) Filed: Dec. 27, 2012

(65) Prior Publication Data

US 2013/0173090 A1 Jul. 4, 2013

(30) Foreign Application Priority Data

Dec. 29, 2011 (FR) ...................................... 11 04130

(51) Int. Cl.
*G01D 1/00* (2006.01)
*G01C 23/00* (2006.01)
*G08G 5/00* (2006.01)

(52) U.S. Cl.
CPC .............. *G01C 23/00* (2013.01); *G08G 5/0039* (2013.01); *G08G 5/0052* (2013.01); *G08G 5/0021* (2013.01)

(58) Field of Classification Search
CPC ........ B64C 19/00; G05D 1/00; G05D 1/0202; G05D 1/101; G05D 1/042; B64D 45/00; G01C 23/005; G08G 5/0039; G08G 5/003; G08G 5/0078; G08G 5/025; H04B 7/18506
See application file for complete search history.

(56) References Cited

U.S. PATENT DOCUMENTS 6,181,987 B1 * 1/2001 Deker et al. ...................... 701/3
6,691,004 B2 * 2/2004 Johnson et al. .................. 701/14
(Continued)

FOREIGN PATENT DOCUMENTS

FR 2848306 A1 6/2004
FR 2937453 A1 4/2010

OTHER PUBLICATIONS

M. Paglione, et al., "Application of Statistical Quality Control Techniques to the Detection of Lateral Adherence to a Flight Plan", Annual Air Traffic Control Association Conference Proceedings, Nov. 4, 2001, pp. 162-166, XP009040846.
(Continued)

*Primary Examiner* — Jerrah Edwards
*Assistant Examiner* — Demetra Smith-Stewart
(74) *Attorney, Agent, or Firm* — Baker & Hostetler LLP (57) ABSTRACT

A configured aircraft flight management aid system comprises: means of interpretation receiving data taken from external instructions from an external control center, data relating to aircraft equipment failures, cabin problems and problems related to the environment of the aircraft; means of determination receiving data from the means of interpretation and determining at least one reference constraint associated with at least one parameter representative of a flight path, a reference constraint associated with a reference parameter comprising a new constraint, different from the initial constraint when the item of data effectively necessitates following a new path, different from the initial path, and a reference constraint comprising the initial constraint when the means of determination do not have access to any data relating to an event effectively necessitating following a new path; warning means generating a warning to an operator when the path actually flown does not comply with said reference constraint.

14 Claims, 3 Drawing Sheets

(56) References Cited

U.S. PATENT DOCUMENTS

| | | |
|---|---|---|
| 7,797,102 B2 * | 9/2010 | Fortier .......................... 701/467 |
| 2004/0008253 A1 * | 1/2004 | Monroe ........................ 348/143 |
| 2004/0239550 A1 * | 12/2004 | Daly, Jr. ..................... 342/26 B |
| 2005/0203676 A1 | 9/2005 | Sandell et al. |
| 2006/0025898 A1 | 2/2006 | Charles |
| 2007/0130599 A1 * | 6/2007 | Monroe ........................ 725/105 |
| 2008/0027629 A1 * | 1/2008 | Peyrucain et al. ............ 701/206 |
| 2008/0195309 A1 * | 8/2008 | Prinzel, III et al. ........... 701/208 |
| 2008/0300737 A1 * | 12/2008 | Sacle et al. ........................ 701/3 |
| 2010/0100308 A1 | 4/2010 | Coulmeau et al. |
| 2012/0029737 A1 * | 2/2012 | Marty et al. ...................... 701/3 |

OTHER PUBLICATIONS

George K. Fourlas, et al., "Detection of Flight Plan Divergence in the Horizontal Plane", AIAA Guidance 2006 Navigation and Control Conference, Jan. 1, 2006, pp. 5089-5103, vol. 8, XP008096599.

* cited by examiner

AIRCRAFT FLIGHT MANAGEMENT AID DEVICE

CROSS-REFERENCE TO RELATED APPLICATION

This application claims priority to foreign French patent application No. FR 1104130, filed on Dec. 29, 2011, the disclosure of which is incorporated by reference in its entirety.

FIELD OF THE INVENTION

The invention relates to navigation aid systems installed on board an aircraft. The type of aviation involved can be commercial (mass, regional or business travel) or military (weapon, cargo or patrol aircraft). It can also involve remote controlled aircraft having no pilots on board.

BACKGROUND

These navigation aid systems conventionally comprise an FMS (Flight Management System) flight management system. The flight management system is used by a computer installed on board an aircraft. The means for constructing a flight plan are functions of the computer of the FMS.

Conventionally, a flight plan defines the route that the crew of an aircraft plans to follow in order to go from a departure position to a destination point of its mission as well as the conditions along this route.

The flight plan comprises initial flight constraints on respective parameters representative of a path (four-dimensional, 3D and time/speed) the aircraft is supposed to follow between its position of departure and a point of destination. The parameters representative of the path that the aircraft is supposed to follow can correspond to the position of the aircraft, that is to say its position in a horizontal plane and its altitude, its speed, its vertical speed, its heading, its roll, its pitch, the monitoring of radio signals, the roll, the pitch, the thrust, of waypoints, of a volume in which the aircraft must be around an airport, etc.

The flight constraints associated with these various parameters are values that these parameters must take or ranges of values within which the various parameters must be included. It is, for example, the lateral path (in a horizontal plane) of the aircraft or its vertical path (in a vertical plane), a minimum or maximum altitude, a heading to take, positions of waypoints through which the aircraft must pass, a minimum thrust to be achieved, a maximum speed to reach, etc.

In commercial flight, the aircraft is supposed to follow a flight plan called the active flight plan which comprises initial constraints on parameters representative of a path that the aircraft is supposed to follow initially. Any deviation of the path actually followed by the aircraft with respect to the initial path must be caused by an event which is:

either an external instruction coming from an external center, for example AOC (Air Operation Center) centers or ATC (Air Traffic Control) centers, or an external agreement originating from one of these centers, or a problem within the aircraft (cabin problem or failure of one of the aircraft's piecessw of equipment), or a problem related to the environment of the aircraft (meteorological problem, terrain risk or risk of collision related to traffic).

Reciprocally, a certain number of instructions or of problems must give rise to a deviation of the path actually flown by the aircraft with respect to the initial path (more or less long term).

However, the pilot is free to depart or not from the initial path when one of the events listed above occurs. He can also take the initiative to depart from the initial path without one of these events having occurred.

The pilot can thus freely cause the aircraft to deviate substantially from the path that it is supposed to follow (which can be the initial path or a new path adapted to the situation). The consequences of such a deviation can result in a reduction of the fuel reserve, of the safety of the path with respect to obstacles, a violation of noise restrictions, overflying restrictions, penetration into prohibited airspace. In the case of failure of an equipment of the aircraft, the pilot may not divert the aircraft to a path adapted to the situation and this can result in a reduction of the safety margins for the continuation of the flight.

SUMMARY OF THE INVENTION

The purpose of the present invention is to overcome the abovementioned disadvantages.

For this purpose, the invention relates to an aircraft flight management aid system configured to have access to a flight plan comprising initial constraints relating to respective parameters representative of an initial flight path that the aircraft is supposed to follow initially, said system being furthermore configured to have access to the effective values of said parameters, said values being representative of the path actually followed by the aircraft, said system comprising:

means of interpretation capable of receiving data relating to events likely to necessitate the following of a new path, different from the initial path, and of determining if they effectively necessitate the following of a new path, said data being taken from among: external instructions coming from an external control center, data relating to aircraft equipment failures, data relating to cabin problems and data relating to problems related to the environment of the aircraft, means of determination capable of receiving data from the means of interpretation and of determining, at regular time intervals, at least one reference constraint associated with at least one parameter representative of a flight path, a reference constraint associated with a reference parameter comprising a new constraint, different from the initial constraint associated with this parameter, when the means of determination have access to an item of data relating to an event effectively necessitating the following of a new path, different from the initial path, and a reference constraint comprising the initial constraint associated with this parameter when the means of determination do not have access to any data relating to an event effectively necessitating the following of a new path, checking means, capable of checking, at regular time intervals, from an effective value of said at least one parameter, if the path actually flown by the aircraft complies with said reference constraint associated with this parameter, warning means capable of generating a warning to an operator when the path actually flown by the aircraft does not comply with said at least one reference constraint.

Advantageously, the means of interpretation comprise a database, storing data relating to reference events effectively necessitating the following of a new path and means of checking that an item of data is relative to a reference event.

Advantageously, when the means of determination have access to an item of data effectively necessitating the following of a new path, the warning means generate a warning to an operator when the path actually flown by the aircraft does not comply with said at least one reference constraint solely when a non-zero duration d has elapsed since a reference time corresponding to the reception of said item of data.

Advantageously, the system comprises means for determining a duration d and possibly a reference time from an item of data.

Advantageously, said at least one reference constraint relating to a parameter comprises a tolerance regarding the compliance with said reference constraint.

Advantageously, the system comprises means for generating an audible or visual warning in the cockpit and/or in the cabin and/or means for transmitting a warning to an external center.

Advantageously, the system comprises an inhibition database listing conditions for inhibiting a warning, said warning means being capable of checking if an inhibiting condition is valid and generating a warning only if no inhibiting condition is valid.

Advantageously, the system comprises selection means capable of determining, when the system has access to several items of data, a priority item of data among said items of data according to the event to which they relate, only said priority item of data being transmitted to the means of determination.

Advantageously, the priority item of data is moreover selected from the following list in which the events are listed from the one of highest priority to the one of least priority: terrain problem, warning coming from a TCAS system, windshear zone warning, storm zone, major failure, instruction coming from an external center.

In a first embodiment, said system is integrated in a centralized FWS warning management system.

In a second embodiment, the means of interpretation comprise first means of interpretation able to receive data coming from first monitoring means able to be informed of cabin problems and to receive data on problems related to the environment of the aircraft and flight instructions, the first means of interpretation are integrated in a dedicated module furthermore integrating the checking means and the means of determination, the means of interpretation furthermore comprise second means of interpretation able to receive data coming from second monitoring means able to be informed of aircraft equipment failures, said second means of interpretation being integrated in a centralized warning management system furthermore integrating the warning means.

Advantageously, the first monitoring means comprise first acquisition means integrated in the dedicated module able to determine effective values of flight parameters from the instructions transmitted to the flight controls, second acquisition means integrated in the FMS and being able to determine effective values of flight parameters, and third acquisition means integrated in an automatic pilot device and being able to determine effective values of flight parameters from flight controls generated by this device.

BRIEF DESCRIPTION OF THE DRAWINGS

Other features and advantages of the invention will become apparent on reading the following detailed description, given by way of non-limiting example and with reference to the appended drawings in which.

In each of the figures, the same elements are indicated by the same references.

DETAILED DESCRIPTION

Figure 1:
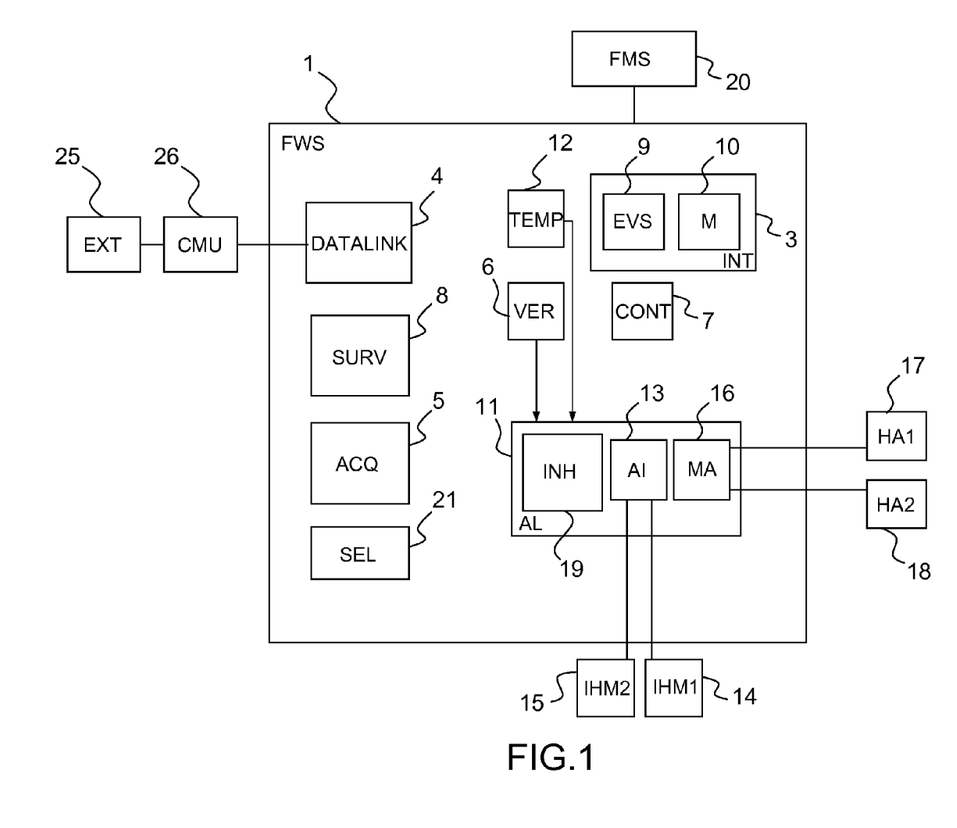
FIG. 1 is a block diagram of a system according to a first embodiment of the invention.

FIG. 1 shows a flight management aid system according to a first embodiment of the invention. The steps of the method implemented by this device have also been shown in FIG. 2.

In this embodiment, the flight management aid system is implemented in a centralized FWS (Flight Warning System) warning management system 1. An FWS conventionally receives information on the state of the flight management and control systems (flight control system, hydraulic systems, electrical system, computers). The FWS conventionally receives data relating to failures or risks of failure of equipment of the aircraft via failure detection or risk of failure detection functions. It conventionally comprises functions for generating warnings in the case of a failure or a risk of failure.

These mechanisms can easily be adapted to the case of the generation of warnings in the case of absence of correlation, between a deviation between the path actually followed by the aircraft and an expected path, and an event at the origin of this deviation or in the case of absence of correlation between an event necessitating such a deviation and the path actually flown by the aircraft.

An FWS is conventionally a calculating data processing module dedicated to the management of warnings.

The flight management aid system according to the invention is configured to have access to a flight plan, called the active flight plan, comprising initial constraints on respective parameters representative of an initial flight path that the aircraft is supposed to follow. Examples of representative parameters of the flight plan and the significance of the associated constraints have been described above.

The system according to the invention is, for example, connected to an FMS (Flight Management System) flight management system 20 comprising means of storage of a flight plan that the aircraft is supposed to follow. The flight plan that the aircraft is supposed to follow is commonly called the active flight plan.

Figure 2:
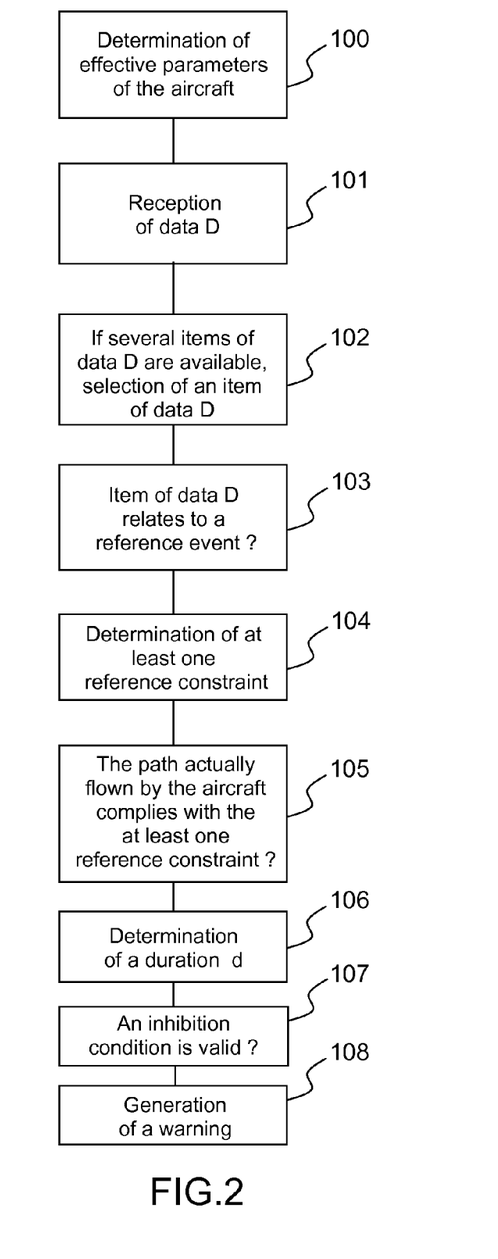
FIG. 2 is a diagrammatic representation of the steps implemented by the system shown in FIG. 1.

The system according to the invention also comprises means of interpretation 3 able to receive 101 data D relative to events likely to effectively necessitate the following of a new path and to determine if this data D effectively necessitates the following of a new path.

The digital data D relative to events likely to result in modifications of the active flight plan can be data taken from among:

external instructions coming from an external center, for example AOC (Air Operation Center) or ATC (Air Traffic Control) centers, or agreements to modify the path of the aircraft coming from one of these centers, data relating to aircraft equipment failures and to aircraft cabin problems, data relating to problems connected with the environment of the aircraft such as, for example, storms, risks related to the geography of the terrain that the aircraft is flying over and collision risks.

The data on collision risks can be warnings coming from a TCAS (Traffic Alert and Collision Avoidance System) system.

The data relating to meteorological risks can be warnings of windshear zones.

It can also be three-dimensional meteorological radar images of a storm zone located ahead of the aircraft. These images can come from external centers or from sensors installed on board the aircraft (and called a "weather radar system").

The external instructions can be flight clearances. The clearances are translations of vocal instructions into digital messages or data. The clearances are sent from an ATC or an AOC or by means of a digital link to the system according to the invention.

In order to receive certain items of data relating to problems in the environment of the aircraft and the external instructions, the system according to the invention advantageously comprises digital datalinks 4, (DATALINK), allowing the system to communicate with external centers EXT 25 by the intermediary of a CMU (Communication Management Unit) unit 26 providing an advantageously bidirectional communications link between the aircraft and the external centers EXT, 25. The external centers EXT 25 are, for example, airline AOC or ATC centers, other aircraft or meteorological centers.

The system is advantageously configured to have access to data D relating to cabin problems and to aircraft equipment failures. For this purpose, the system according to the first embodiment 1 comprises means of monitoring SURV 8 the equipment of the aircraft or of the cabin.

Moreover, the system is configured to have access to the effective values of parameters representative of a flight path, said values being representative of the flight path actually flown by the aircraft.

For this purpose, the system according to the first embodiment comprises acquisition means ACQ 5 able to determine 100 the effective values of parameters.

The effective values are determined from measurements made by sensors or from information coming from aircraft equipment. They constitute a knowledge base of the path and attitude of the aircraft.

These acquisition means ACQ 5 are, for example, able to retrieve position measurements of the aircraft coming, for example, from position sensors and/or from instructions transmitted to the flight controls generated by the flight control computers relating, for example, to the setting of control surfaces and/or from items of information on the path followed by the aircraft when the automatic pilot system of the aircraft is engaged and/or from parameter values related to the configuration of the flight equipment of the aircraft (such as, for example, the flaps, the landing gear, airbrakes) and/or from measurements coming from an ARIDU (Air Data Inertial Reference Unit) or an ADIRS (Air Data Inertial Reference System), such as, for example, measurements of speed, vertical speed, altitude, roll, pitch and/or from measurements coming from inertial sensors.

The effective values of the parameters are, for example, the current values of these parameters. They can also be calculated from measurements made at different times, such as for example the value of a heading actually followed by the aircraft, or a temporal average of measurements spaced over time.

The system according to the invention comprises checking means VER 6 which have a function of detection of inconsistency between the path actually flown by the aircraft and an expected path. They check if the path actually flown by the aircraft is the expected path.

The expected path is a path defined by the system and which the aircraft is supposed to follow. This expected path is materialized by one or more reference constraints on one or more parameters representative of a flight path.

The checking means VER 6 check 105, at regular time intervals, from the effective value of at least one parameter representative of a flight path, if the path actually flown by the aircraft complies with a reference constraint associated with that parameter.

The time interval is of the order of a few seconds.

The path actually flown by the aircraft is a four-dimensional path (three spatial dimensions and one temporal dimension).

The system comprises means of determination CONT 7 for determining the reference constraints.

These means CONT 7 are able to receive data coming from the means of interpretation 3. They can receive all of the data coming from the means of interpretation 3 or only some of the information as shall be seen below.

These means CONT 7 determine 104, at least one reference constraint representative of a flight path. The means CONT 7 determine the reference constraint or constraints at regular time intervals.

The values of the reference constraints are initialized at the initial values of the constraints. When the means CONT 7 have access to an item of data D, they determine the reference constraint or constraints on reception of the item of data D, from this item of data D.

A reference constraint associated with a parameter is a new constraint, different from the initial constraint associated with that parameter when the means of determination CONT 7 have access to an item of data D relating to an event effectively necessitating the following of a new path, different from the initial path.

An example of an item of data effectively resulting in the necessity of following a new path is a 3D map of a storm on the initial path that the aircraft is supposed to follow.

On the other hand, a reference constraint associated with a parameter comprises the initial constraint associated with that parameter when the means of determination CONT 7 do not have access to an item of data D relating to an event effectively necessitating the following of a new path, different from the initial path. This is the case when the means of determination do not have access to any item of data or when they have access to an item of data which effectively does not necessitate the following of a path different from the initial path. In other words, the aircraft must always follow the initial path which is determined by the flight plan.

Advantageously, the means of interpretation 3 comprise a database EVS 9, storing reference events effectively necessitating the following of a new path and means M 10 for checking 103 that a received item of data D relates to a reference event.

When this is the case, the means CONT 7 determine, from the item of data D, one or more new constraints associated with one or more parameters representative of flight paths.

For example, an engine failure whilst cruising results in an initial descent over a minimum time period, followed by a leveling at a maximum altitude corresponding to the maximum altitude authorized with a failed engine. The translation in terms of constraints for the "engine failed whilst cruising" event is a descent to a maximum altitude or lower. In other words, a first constraint is a constraint on the speed which consists in a minimum speed allowable at the altitude of the failure below which the descent must be started in order not to stall. A second constraint is a vertical path comprising a descent followed by a leveling. A third constraint is on the altitude of the aircraft, which must be below a maximum altitude but above the altitude of the overflown relief.

When an item of data D does not necessitate following a new path, the path the aircraft is supposed to follow remains the initial path defined by the flight plan. The checking means VER 6 check 105, from values of parameters coming from the first monitoring means SURV1 5, if the path actually flown by the aircraft is in fact the initial flight path defined by the flight plan.

As described at the beginning of the document, the constraints are not necessarily lateral and vertical paths. It can also be a matter of constraints on the following of targets, constraints on heading, altitude, speed, vertical speed, attitude with respect to the maneuver, preliminary speed profile, roll, pitch, thrust and target following.

For example, in the takeoff phase, if the aircraft must follow the active flight plan, the latter comprises a constraint in terms of takeoff thrust. The thrust must reach a target takeoff thrust N1.

The reference constraints can be constraints on parameters (new constraints or initial constraints). They can also comprise tolerances on the compliance with these constraints. The tolerances make it possible to allow the pilot a maneuvering margin. They make it possible to limit the nuisance that would be caused by warnings generated whilst the deviation of the path actually flown by the aircraft with respect to the expected path is acceptable.

The system according to the invention furthermore comprises warning means AL 11 receiving, as input, the output of the checking means 6. These warning means are able to generate 108 warnings to an operator when the path actually flown by the aircraft does not comply with the reference constraint or constraints. In other words, a warning is generated when the effective values of the parameters representative of the flight path do not comply with the reference constraints in question.

In brief, the system according to the invention checks if a modification of the path actually flown by the aircraft originates in an external command (AOC/ATC), a problem within the aircraft (systems or cabin), or a change in the environment (meteo, terrain risk or traffic).

It also checks that an external instruction (AOC/ATC), a problem within the aircraft (systems or cabin), a problem relating to the environment (meteo, terrain risk or traffic) of the aircraft imposing a modification of the path of the aircraft involves a modification of the path actually flown by the aircraft.

Once this check is completed, a warning is generated if a deviation is detected between the expected path and the path actually flown by the aircraft.

The system according to the invention thus has the advantage of warning an operator in two cases:
  in the absence of reaction of the aircraft to an instruction, a meteorological or terrain or cabin problem imposing a deviation of the path of the aircraft, for example in the case of the pilot not understanding or when the pilot is not capable of deviating the path as he should,
  when the path actually flown by the aircraft becomes distant from the path provided by the flight plan without known reason, for example in the case of pilot error or abnormal behavior by the pilot.

In other words, a warning is generated in the absence of a cause-to-effect link between an event and a deviation between the path actually flown by the aircraft and an expected path.

For example, if the aircraft carries out one of the following actions: a "Direct To" (proceeding directly to a waypoint of the flight plan), a "Hold" (entry into a holding circuit) or rejoining the approach, its cause can be found in an instruction coming from the ATC. If no instruction from the ATC is received by the system according to the invention, the expected path is the initial path which does not include actions of this type. Thus, if a deviation is detected between the path actually flown by the aircraft and the initial path defined by the flight plan, a warning is generated because this deviation has no cause.

The system according to the invention therefore makes it possible to limit the consequences due to pilot errors and to improve the safety of flights.

This solution is transparent to the pilot when no inconsistency is detected (no warning is therefore presented) and does not require any particular pilot action for its implementation.

Advantageously, the system is configured to receive information on the flight phase: takeoff, visual maneuver, approach, go-around. These items of information come, for example, from the FMS 20. Advantageously, the reference constraints depend on the flight phase. This makes it possible to adapt the monitoring of a deviation with respect to an expected path in the best way possible. In fact, constraints are imposed on different parameters according to the flight phase. For example, thrust is of interest in the takeoff phase, distance from the three-dimensional path in the go-around phase or pitch or vertical speed values on the ascent path, the position of the aircraft with respect to an airport in the approach phase. Advantageously, the same constraints are not chosen in the case of an engine failure during the takeoff phase or during the approach phase.

The tolerances also advantageously depend on the flight phase. The reference events resulting in a modification of the flight plan can also depend on the flight phase.

The warning means 11 can generate 108 a warning as soon as the reference constraint or constraints are not complied with. In other words, a warning is generated when, at a time of calculation, the values of the parameters of the aircraft indicate that the path actually flown by the aircraft does not comply with the reference constraint or constraints.

The warning means 11 can also generate 108 a warning when the path flown by the aircraft is different from the expected path only when a duration d has elapsed since a reference time.

The system advantageously comprises timing means TEMP 12 able to determine 106 a duration d and possibly a reference time from an item of data D.

The duration d is the time period allowed for the pilot to react after a reference time.

The reference time is advantageously the time of reception of the item of data when the item of data which is available to the system effectively necessitates a modification of the path. The duration d is therefore the time period allowed for the pilot to react after reception of the item of data in question.

In a first example, the system does not have access to data effectively necessitating a modification of the path, the reference time is advantageously the time of calculation and the duration is advantageously zero.

In this case, the warning is generated as soon as the path actually flown by the aircraft does not comply with the reference constraint or constraints in question.

In a second example, during a takeoff phase, the flight plan defines a constraint in terms of minimum thrust N1. The constraint is advantageously assigned a tolerance. This tolerance is, for example, fixed at 2.5% of the minimum thrust N1. Advantageously, a duration d of the order of 9 seconds and a reference time (for calculating the duration) equal to the time of applying thrust are fixed. A warning is produced if the thrust of the aircraft is below a minimum thrust less the tolerance only when a duration d has elapsed since the application of thrust.

The timing means principally make it possible to limit nuisance warnings reflecting a transient phase in the change of piloting parameters and to allow flexibility in the control of the aircraft, especially in degraded conditions. The pilot is not obliged to modify his path instantly in response to an event which necessitates it. The generation of nuisance warnings is thus limited.

In a third example, an aircraft is following the flight plan between two waypoints. The path of the aircraft is resumed at a constant altitude and Mach number and on a constant route. An instruction coming from the ATC requires turning 20 degrees to the right in order to avoid traffic. This instruction results, in terms of constraint, in a new heading value to be complied with corresponding to the preceding heading increased by 20 degrees. This new constraint materializes the amended path. For this amendment it is defined that completion must be achieved within a period of 30 seconds after receiving the ATC instruction. The distracted pilot forgets to carry out the lateral maneuver. The warning means 11 compare the current heading with the expected heading and detect a deviation of 20 degrees. When 30 seconds have elapsed after receiving the ATC instruction, they generate a warning to the crew.

The duration d can be predetermined or can depend on the flight phase and/or on the item of data D and/or on the event in question. It depends on the degree of urgency for joining the new path.

The warning is generated to be sent to the pilot and/or to an air control center such as the AOCs and the ATCs and/to the cabin.

In the example shown in FIG. 1, the warning means 11 comprise display means Al 13, which are, in the example shown in FIG. 1, integrated in the FWS centralized warning management system 1 in order to display an inconsistency message on a first man-machine interface IHM1, 14 placed in the cockpit and on a second man-machine interface IHM2, 15 placed in the cabin.

The warning means 11 also comprise means of generating an audio message MA, 16 in order to convey a message or an audio signal by means of at least one loud-speaker HA1, 17 which can be placed in the cockpit and/or by means of at least a second loud-speaker HA2, 18 which can be placed in the cockpit.

The warning means 11 can also transmit a message relating to an inconsistency to an ATC or to an AOC or to a remote piloting center, which is not shown, via digital data links 4, DATALINK.

Advantageously, the warning means AL 11 comprise an inhibition database INH 19, listing warning inhibition conditions. The warning means AL 11 are advantageously able to check 107 if an inhibition condition is complied with and generate a warning only if no inhibition condition is complied with.

For example, the warning corresponding to a storm is inhibited when the aircraft is on the ground.

The inhibition conditions can be flight phases (landing, takeoff, phases of the procedure), flight procedures, conditions on the position of the aircraft (altitude, position on the ground). These conditions advantageously depend on the events in question.

This makes it possible not to produce warnings that would have no operational meaning for the recipient in the current situation.

The system comprises selection means SEL 21 able to determine 102, when the system has access to several items of data D, one priority item of data from among these items of data D as a function of the event to which they refer. Only the priority item of data is transmitted to the means of determination of the reference constraint CONT 7.

The priority item of data is advantageously selected from the following list in which the events are listed from the one of highest priority to the one of least priority: terrain problem, warning coming from a TCAS system, windshear zone warning, storm zone, major failure (failure of or problem with a system of the aircraft which can be a failure of an engine of the aircraft or the fact that an engine of the aircraft catches fire), instruction coming from an ATC or AOC.

This makes it possible, when the system receives several items of data D at the same time, that is to say when it has access to several items of data D, to select a priority item of data which is the only item of data transmitted to the means of interpretation.

Advantageously, the first man-machine interface IHM1, 14 comprises means allowing the crew to delete a warning.

Advantageously, the warning messages are deleted automatically when the aircraft is following the expected path.

Figure 3:
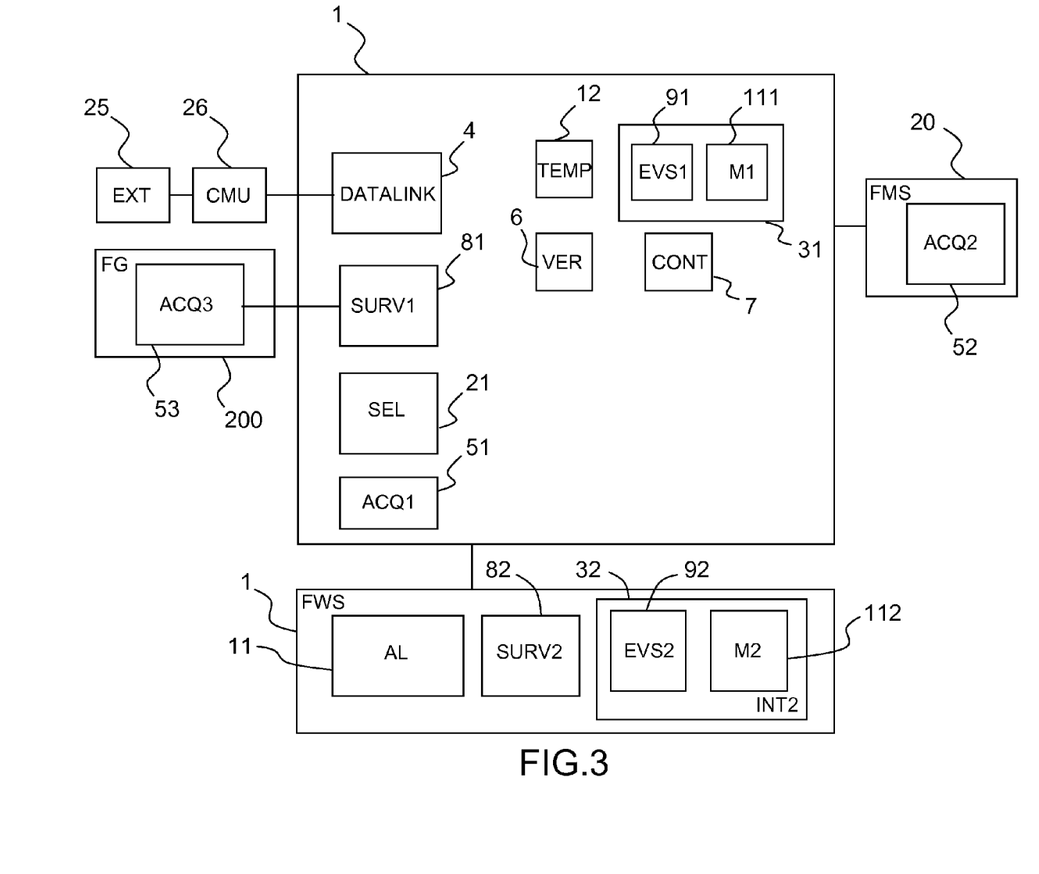
FIG. 3 is a block diagram of a system according to a second embodiment of the invention.

FIG. 3 shows a system according to a second embodiment of the invention.

In this embodiment, the system is no longer totally integrated in an FWS.

The means of interpretation comprise first means of interpretation INT1 31 comprising a first database EVS1 91 of reference events and first means M1 111 for determining if an item of data is relative to a reference event. They also comprise second means of interpretation INT2 32 comprising a second database EVS2 92 of reference events and second means M2 112 for determining if an item of data is relative to a reference event.

The monitoring means comprise first monitoring means SURV1 81 able to be informed of problems in the cabin and to receive data on problems relating to the environment of the aircraft and flight instructions. The first means of interpretation are able to receive data coming from the first monitoring means. The monitoring means furthermore comprise second monitoring means SURV2 82 able to be informed when there is an aircraft equipment failure. The latter means are usually integrated in an FWS.

The second means of interpretation INT2 31 are able to receive the data coming from the second monitoring means SURV2 82 and the second means of interpretation INT2 31 are integrated in an FWS 1.

The first monitoring means as well as the first means of interpretation, the checking means 6, the means of determination 7, the selection means SEL 21 together with the digital data links 4, DATALINK are integrated in a dedicated calculating module which is not shown and which is, for example, a dedicated computer.

The acquisition means are distributed in other calculating modules according to the functions usually implemented in an aircraft. They comprise first acquisition means ACQ1 51 integrated in the dedicated module able to determine the effective values of flight parameters from the instructions transmitted to the flight controls.

Second acquisition means ACQ2 52 are integrated in the FMS 20 and are suitable for calculations carried out by the FMS.

Third acquisition means ACQ3 53 are integrated in an automatic pilot device FG 200 and are able to determine the effective values of flight parameters from the flight instructions generated by this device.

This embodiment makes it possible to take advantage of the functions carried out by the existing calculation modules. Each existing calculation module carries out new functions which remain within the scope of the functions that it already carries out.

The calculation and monitoring means described in the patent application are software partitions of calculation modules or they are dedicated calculation modules.

Examples of events and of processing these events by the system according to the invention are described below. This list of examples is not exhaustive. The numerical values are orders of magnitude given by way of illustration and can be parameterized according to the aircraft in question.

When the system receives an item of data on a terrain risk, the means of determination CONT 7 determine a new constraint on the critical altitude of the aircraft, this recovery altitude having to be more than 3000 feet higher than the altitude of the overflown terrain (one foot being approximately 30.5 centimeters) when an engine has failed and when a descent is initiated and more than 2000 feet when no engine has failed. This warning is, for example, inhibited when the aircraft is in the approach phase or when the aircraft is equipped with a TAWS (Terrain Awareness and Warning System) which generates a terrain proximity warning.

In the case of a failure of the pressurization system or of a pressurization regulating computer, a new constraint on the altitude of the aircraft is determined which must be below a predetermined threshold when the aircraft is not in a descent phase. The predetermined threshold is between 10000 feet and 14000 feet and is preferably equal to 12000 feet.

Advantageously, the warning is given only if a duration d has elapsed after a reference time. The duration d is between 20 sec and 40 sec and is preferably equal to 30 seconds. The reference time is the time of reception of the warning.

The warning is inhibited when the altitude of the aircraft is less than 10000 feet, when the terrain margin is small. In the case of a terrain warning from the TAWS system, the warning is inhibited in order to prevent a nuisance during an avoidance maneuver based on this latter monitoring system. As seen above, terrain warnings have priority over pressurization system failures (major failure).

The flight clearances issued by the ATC impose the following of new paths which are materialized by constraints of the type: HDG, HDG to a waypoint, Direct To followed by a waypoint, FL/altitude, in terms of speed. Advantageously, the corresponding warnings are given only if a duration d has elapsed after a reference time and if no action has been taken to meet these requirements. The duration d is between 15 and 40 seconds and is preferably equal to 30 seconds. The reference time is the time of reception of the request from the ATC.

A target capture instruction FL220 in the climb phase translates into terms of constraints in terms of capturing the target FL220 in the climb phase. The path actually followed by the aircraft does not comply with this constraint when the target actually aimed at is different. The target actually aimed at is, for example, the target represented by the "selected altitude" parameter. When the clearance imposes a speed, a new constraint is calculated corresponding to the maintaining of this speed. Advantageously, the new constraint also comprises a tolerance of 10 knots. One knot is equal to 1.852 $km·h^{-1}$.

As for the other types of data D, the new constraints can be constraints determining the new path which is the path that the aircraft is supposed to fly when the aircraft receives the item of data D. It can also be a matter of constraints determining a transient path (or joining path) between the initial path and the new path that the aircraft is supposed to follow. A warning is then generated when, at the time of calculation of the path actually followed by the aircraft, the aircraft is not complying with the constraints associated with the transient path.

When the aircraft must follow the initial path, a reference constraint consists in following a predetermined three-dimensional path with a predetermined tolerance corresponding to a threshold distance. The warning is given when, in the current position, the aircraft is located at a greater distance from the path.

When the item of data corresponds to an engine failure out of the takeoff phase, the item of data does not actually necessitate a modification of the path when the aircraft is located at an altitude lower than the critical altitude fixed for a failed engine out of turbulence. A reference constraint consists in imposing a maximum stabilized altitude for the aircraft. A warning is generated when the aircraft stabilizes its height (that is to say it is in level flight) at an altitude higher than the maximum altitude or if the altitude selector is set to an altitude greater than that maximum altitude. The maximum altitude is advantageously the critical altitude limit with a failed engine. It is accepted that a variation in height of less than 120 feet for a duration of 60 sec indicates that the aircraft is in level flight.

In the case of turbulence, the maximum altitude is lower than in the absence of turbulence.

The invention claimed is:

1. An aircraft flight management aid system configured to have access to a flight plan comprising initial constraints relating to respective parameters representative of an initial flight path that an aircraft is supposed to follow initially, the initial constraints corresponding to values that values of respective parameters must take or ranges of values wherein the values of respective parameters must be included and is furthermore configured to have access to the effective values of said parameters, said values being representative of a path actually followed by the aircraft, said system comprising:

means of interpretation configured to receive data D relating to events likely to necessitate the following of a new path, different from the initial path, initial constraints corresponding to values that the values of respective parameters must take or ranges of values wherein the values of respective parameters must be included when receiving a datum D, to determine if said datum effectively necessitate that the aircraft follow a new flight path different from the initial flight path, said data being taken from among:
   external instructions coming from an external control center,
   data relating to aircraft equipment failures,
   data relating to cabin problems,
   data relating to problems related to an environment of the aircraft;

means of determination configured to receive data D from the means of interpretation and to determine, at regular time intervals, at least one reference constraint, representative of unexpected flight path, each reference constraint being associated with one parameter among said parameters, the reference constraint associated with said parameter comprising a new constraint, different from the initial constraint associated with said parameter when the means of determination have access to a datum D relating to an event effectively necessitating the following of the new flight path, different from the initial path, and a reference constraint comprising the initial constraint associated with this parameter when the means of determination do not have access to any data D relating to an event effectively necessitating the following of a new flight path, checking means configured to check, at regular time intervals, if an effective value of at least one reference parameter among said parameters complies with said reference constraint associated with said reference parameter, the effective value of a reference parameter being representative of a flight path actually flown by the aircraft; and
warning means capable of generating a warning to an operator when the effective value of said reference parameter does not comply with said reference constraint.

2. The system as claimed in claim 1, wherein the means of interpretation comprise a database, storing data relating to reference events effectively necessitating the following of a new path and means of checking that an item of data D is relative to a reference event.

3. The system as claimed in claim 1, wherein when the means of determination have access to an item of data D effectively necessitating the following of a new path, the warning means generate a warning to an operator when the path actually flown by the aircraft does not comply with said at least one reference constraint solely when a non-zero duration d has elapsed since a reference time corresponding to the reception of said item of data.

4. The system as claimed in claim 1, comprising means for determining a duration d and possibly a reference time from an item of data D.

5. The systems as claimed in claim 1, wherein said at least one reference constraint relating to a parameter comprises a tolerance regarding the compliance with said reference constraint.

6. The system as claimed in claim 1, comprising means for generating a warning comprising at least one of the following: an audible cockpit warning, a visual cockpit warning, an audible cabin warning, or a visual cabin warning.

7. The system as claimed in claim 1, comprising an inhibition database listing conditions for inhibiting a warning, said warning means being capable of checking if an inhibiting condition is valid and generating a warning only if no inhibiting condition is valid.

8. The system as claimed in claim 1, comprising selection means capable of determining, when the system has access to several items of data D, a priority item of data among said items of data according to the event to which they relate, only said priority item of data being transmitted to the means of determination.

9. The system as claimed in claim 8, wherein the priority item of data is moreover selected from the following list in which the events are listed from the one of highest priority to the one of least priority: terrain problem, warning coming from a TCAS system, windshear zone warning, storm zone, major failure, instruction coming from an external center.

10. The system as claimed in claim 1, said system being integrated in a centralized FWS warning management system.

11. The system as claimed in claim 1, wherein the means of interpretation comprise first means of interpretation able to receive data coming from first monitoring means able to be informed of cabin problems and to receive data on problems related to the environment of the aircraft and flight instructions, the first means of interpretation being integrated in a dedicated module furthermore integrating the checking means and the means of determination, the means of interpretation furthermore comprising second means of interpretation able to receive data coming from second monitoring means able to be informed of aircraft equipment failures, said second means of interpretation being integrated in a centralized FWS warning management system furthermore integrating the warning means.

12. The system as claimed in claim 11, wherein the first monitoring means comprise first acquisition means integrated in the dedicated module able to determine effective values of flight parameters from the instructions transmitted to the flight controls, second acquisition means integrated in the FMS and being able to determine effective values of flight parameters, and third acquisition means integrated in an automatic pilot device and being able to determine effective values of flight parameters from flight controls generated by this device.

13. The system as claimed in claim 1, comprising means for generating a warning that includes means for transmitting a warning to an external center.

14. An aircraft flight management aid system configured to have access to a flight plan comprising initial constraints relating to respective parameters representative of an initial flight path that an aircraft is supposed to follow initially, the initial constraints corresponding to values that values of respective parameters must take or ranges of values wherein the values of respective parameters must be included and is furthermore configured to have access to the effective values of said parameters, said values being representative of a path actually followed by the aircraft, said system comprising:
an interpretation module configured to receive data D relating to events likely to necessitate the following of a new path, different from the initial path, initial constraints corresponding to values that the values of respective parameters must take or ranges of values wherein the values of respective parameters must be included when receiving a datum D, to determine if said datum effectively necessitate that the aircraft follow a new flight path different from the initial flight path, said data being taken from among:
external instructions coming from an external control center,
data relating to aircraft equipment failures,
data relating to cabin problems,
data relating to problems related to an environment of the aircraft;
a determination module configured to receive data D from the interpretation module and to determine, at regular time intervals, at least one reference constraint, representative of unexpected flight path, each reference constraint being associated with one parameter among said parameters, the reference constraint associated with said parameter comprising a new constraint, different from the initial constraint associated with said parameter when the determination module have access to a datum D relating to an event effectively necessitating the following of the new flight path, different from the initial path, and a reference constraint comprising the initial constraint associated with this parameter when the determination module do not have access to any data D relating to an event effectively necessitating the following of a new flight path,
a checking module configured to check, at regular time intervals, if an effective value of at least one reference parameter among said parameters complies with said reference constraint associated with said reference parameter, the effective value of a reference parameter being representative of a flight path actually flown by the aircraft; and
a warning module configured to generate a warning to an operator when the effective value of said reference parameter does not comply with said reference constraint.

* * * * *